(12) United States Patent
Spears

(10) Patent No.: US 7,458,613 B2
(45) Date of Patent: Dec. 2, 2008

(54) ROTATABLE FIRE SPRINKLER FITTING

(75) Inventor: Wayne Spears, Sylmar, CA (US)

(73) Assignee: Spears Manufacturing Co., Sylmar, CA (US)

( * ) Notice: Subject to any disclaimer, the term of this patent is extended or adjusted under 35 U.S.C. 154(b) by 0 days.

(21) Appl. No.: 11/370,261

(22) Filed: Mar. 6, 2006

(65) Prior Publication Data

US 2008/0012327 A1    Jan. 17, 2008

(51) Int. Cl.
*F16L 55/00* (2006.01)

(52) U.S. Cl. .............................. 285/148.11; 285/148.13; 285/286.1; 285/293.1; 285/390; 285/392

(58) Field of Classification Search ............ 285/148.11, 285/148.12, 148.13, 197, 286.1, 293.1, 390, 285/392
See application file for complete search history.

(56) References Cited

U.S. PATENT DOCUMENTS 1,233,644 A * 7/1917 Clark ..................... 285/148.13

\* cited by examiner

*Primary Examiner*—Aaron M Dunwoody
*Assistant Examiner*—Fannie Kee
(74) *Attorney, Agent, or Firm*—Denton L. Anderson; Sheldon Mak Rose & Anderson PC

(57) ABSTRACT

A fire sprinkler fitting has a cylindrical body and an insert. The insert has an inner end which is disposed within a proximal portion of the bore, such that the outer end protrudes beyond the open bore end by a distance D. The outer end has internal threads which are sized and dimensioned to accept and retain a fire sprinkler therein. The insert is rotatable within the body without effecting the distance D.

19 Claims, 4 Drawing Sheets

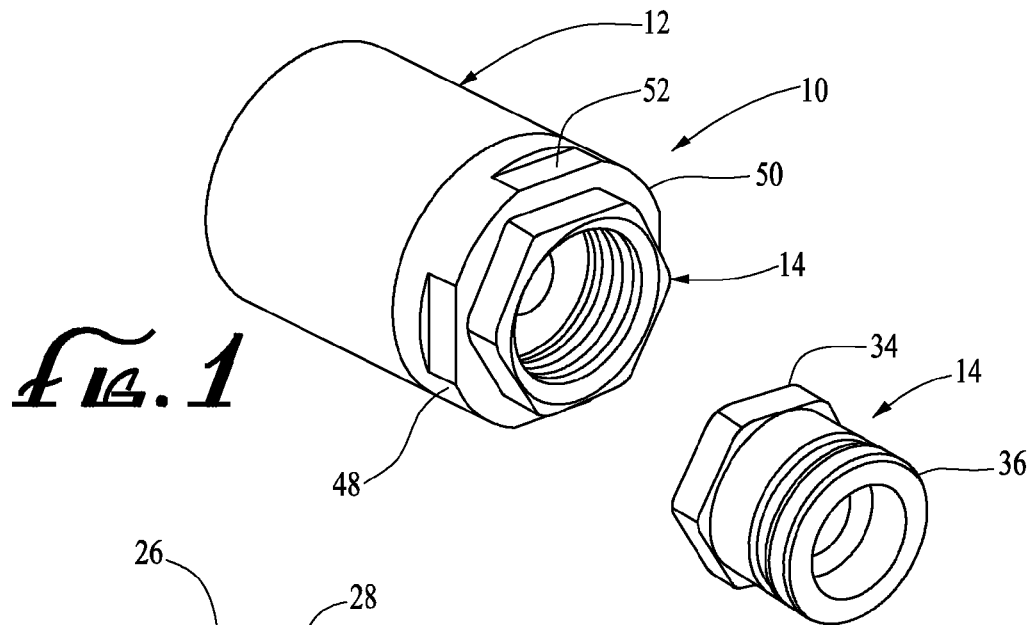
fig.1
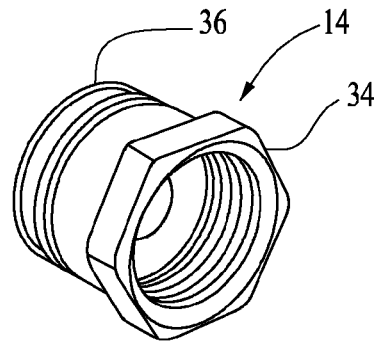
fig.2A
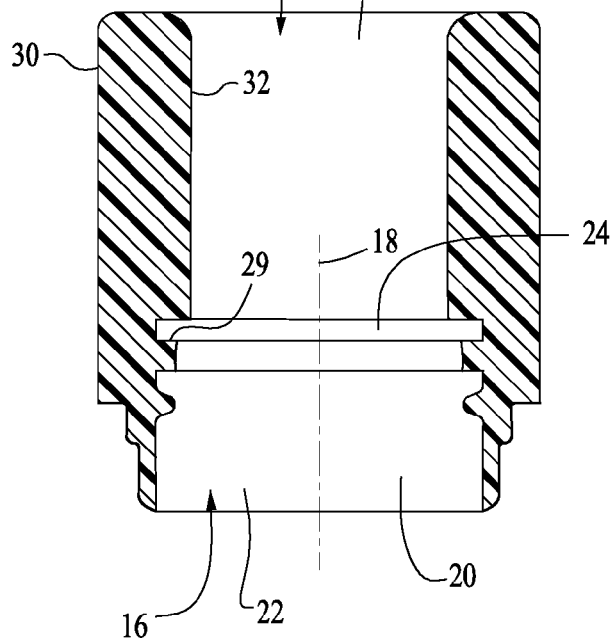
fig.2B
fig.3

ROTATABLE FIRE SPRINKLER FITTING

BACKGROUND OF THE INVENTION

Fire sprinkler systems are increasingly recognized as necessary safety features in the construction of new buildings and in the upgrading of existing buildings. There is a problem, however, in the installation of fire sprinkler systems.

Many styles of fire sprinkler heads have built-in deflectors that require rotational orientation of the sprinkler head to correctly position the deflector to produce the desired spray pattern when the head operates. All prior art fire sprinkler heads are attached to the piping mains by tapered pipe threads designed to produce a water tight seal using the interference of the tapered threads, plus either or both of a thread tape or thread paste. Thus, it can be appreciated that proper orientation of prior art sprinkler heads can usually only be accomplished by under-tightening the sprinkler heads or over-tightening the sprinkler heads. Overtightening of the tapered pipe threads produces interference between the mating threads, resulting in distortion of the mating parts. Undertightening over the tapered pipe threads can produced leaks.

Accordingly, there is a need for a fire sprinkler fitting which avoids the aforementioned in the prior art.

SUMMARY

The invention satisfies this need. The invention is a fire sprinkler fitting comprising (a) a cylindrical body defining a bore with a center line, an open bore end, the bore having a distal portion adjacent to the open bore end and a proximal portion spaced apart from the open bore end, and (b) an insert having an outer end and an inner end, the inner end being disposed within the proximal portion of the bore such that the outer end protrudes beyond the open bore end by a distance D, the outer end having internal threads which are sized and dimensioned to accept and retain a fire sprinkler therein. In the invention, the insert is rotatable within the body without affecting the distance D.

DRAWINGS

These and other features, aspects and advantages of the present invention will become better understood with reference to the following description, appended claims and accompanying drawings where:

FIG. 1 is a perspective view of a first embodiment of a fire sprinkler fitting having features of the invention;

FIG. 2A is a rear perspective view of an insert used in the fire sprinkler fitting illustrated in FIG. 1;

FIG. 2B is a front perspective view of the insert illustrated in FIG. 2A

FIG. 3 is a cross-sectional side view of the fire sprinkler fitting illustrated in FIG. 1;

DETAILED DESCRIPTION

Figures 4, 5:
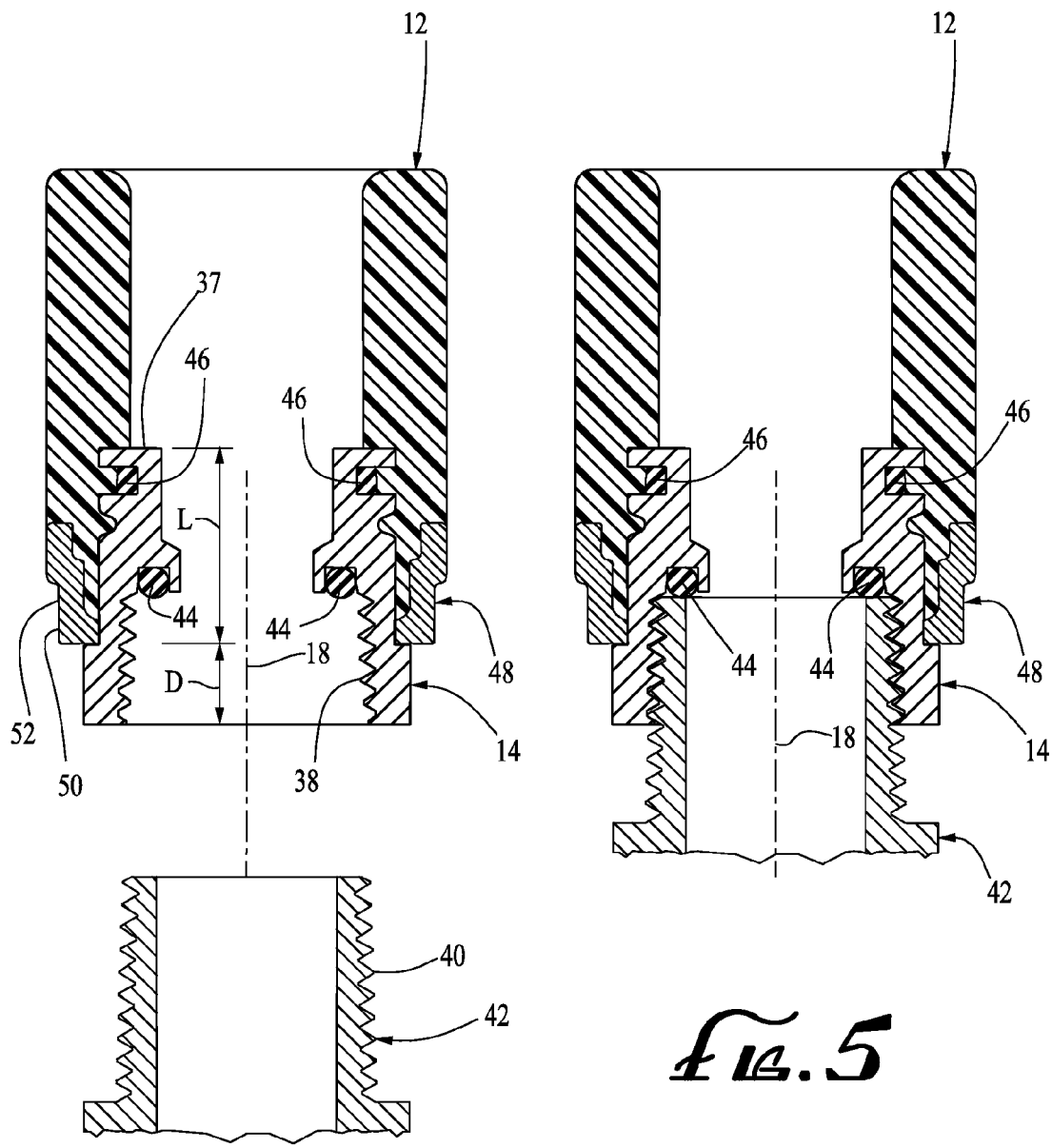
FIG. 4 is a cross-sectional side view of the fire sprinkler fitting illustrated in FIG. 1, showing an insert attached to the cylindrical body.
FIG. 5 is a cross-sectional side view of the fire sprinkler fitting illustrated in FIG. 1, showing an insert attached to the cylindrical body and a sprinkler head attached to the insert.

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is a fire sprinkler fitting 10 comprising a cylindrical body 12 and an insert 14 disposed within the cylindrical body 12.

The cylindrical body 12 defines a bore 16 with a centerline 18 and an open bore end 20. The bore 16 has a distal portion 22 adjacent to the open bore end 20 and a proximal portion 24 spaced apart from the open bore end 20. The cylindrical body 12 also defines an inlet end 26 having an open inlet bore 28.

The proximal portion 24 of the bore 16 defines a shoulder 29 disposed in a plane which is perpendicular to the centerline 18 of the bore 16.

In the embodiment illustrated in FIGS. 1 and 4-6, the outer side surface 30 of the body 12 is smooth and is sized and dimensioned to match the internal bores 31 of standard pipe fittings 33. Because the outer side surface 30 is smooth and is sized and dimensioned to match the internal bores 31 of standard pipe fittings 33, the fitting is easily disposed within the internal bores 31 of standard pipe fittings used in fire sprinkler systems.

Figure 7:
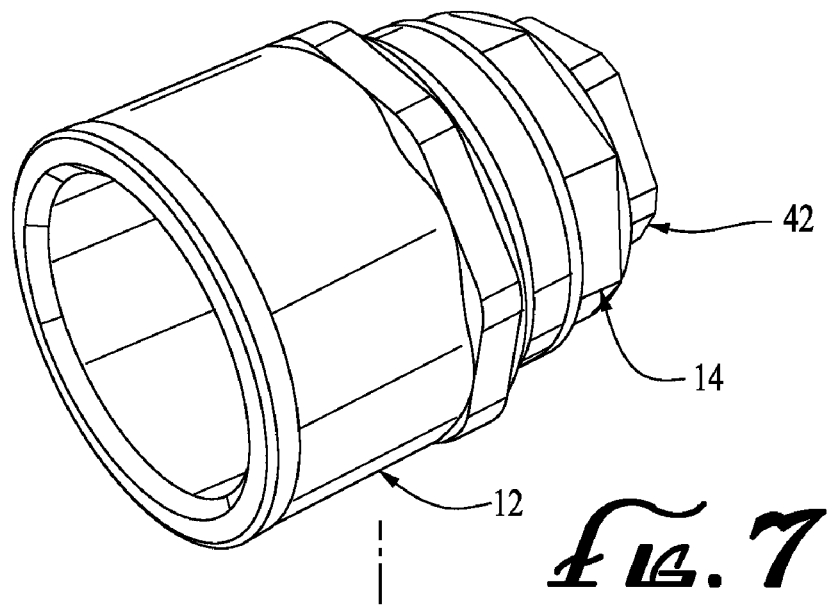
FIG. 7 is a perspective view of a second embodiment of a fire sprinkler fitting having features of the invention.
Figure 8:
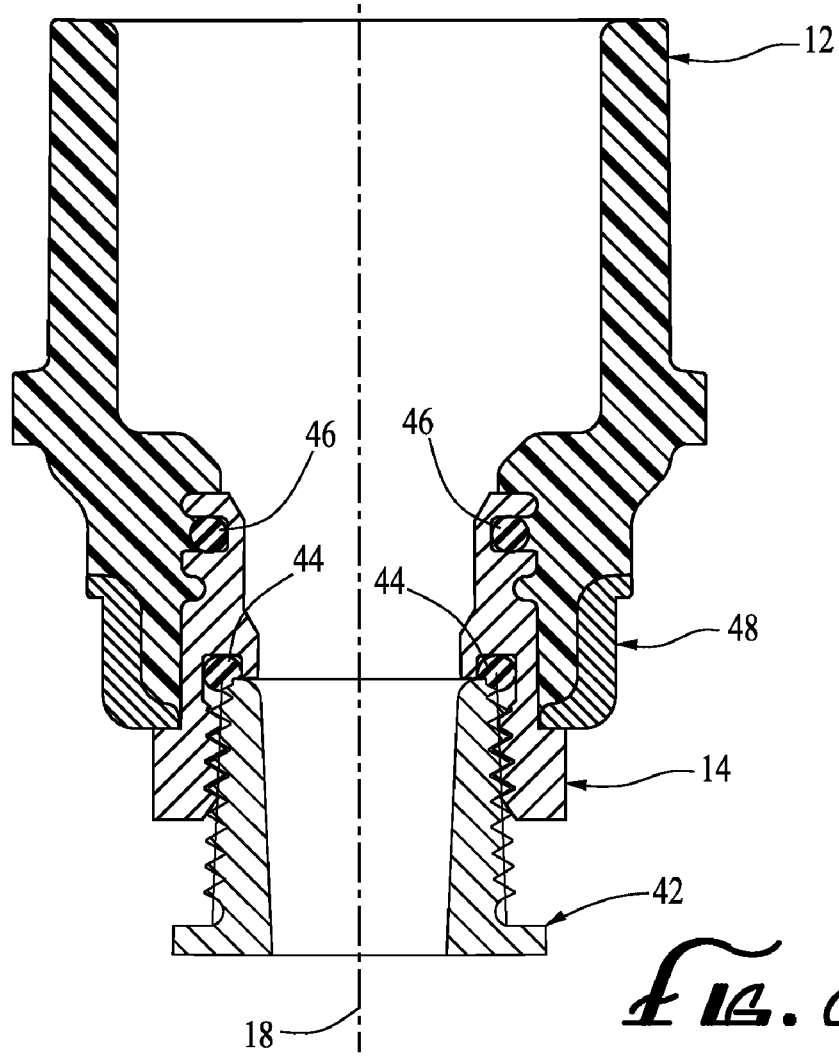
FIG. 8 is a cross-sectional side view of the fire sprinkler fitting illustrated in FIG. 7.

In the embodiment illustrated in FIGS. 7 and 8, the inner side surface 32 of the inlet bore 28 is smooth and is sized and dimensioned to match the exterior dimensions of standard pipe exteriors. Because the inner side surface 32 of the inlet bore 28 is smooth and is sized and dimensioned to match the outer dimensions of standard pipe exteriors, the embodiment of the fitting 10 illustrated in FIGS. 7 and 8 is easily attached to the end of a water supply pipe.

The cylindrical body 12 is typically made from a polymeric material, such as PVC or CPVC. However, cylindrical bodies 12 made from other materials, such as from a metal, can also be used.

The insert 14 has an outer end 34 and an inner end 36. The inner end 36 is disposed within the proximal portion 24 of the bore 16 a distance L from the open bore end 20, such that the outer end 34 protrudes beyond the open bore end 20 by a distance D.

The inner end of the insert 14 defines a circumferential flange 37 which abuts and is retained by a shoulder 29 defined within the proximal portion 24 of the bore 16 within the cylindrical body 12.

The outer end 34 of the insert 14 has internal threads 38 which are sized and dimensioned to accept and retain a fire sprinkler therein.

In the embodiments illustrated in the drawings, the internal threads 38 are sized so as to not produce interference with the exterior threads 40 of a fire sprinkler head 42, but to merely engage and hold the sprinkler head 42 axially against a first elastomeric seal 44. In the embodiments illustrated in the drawings, the first elastomeric seal 44 is an O-ring. Other types of elastomeric seals, such as elastomeric gaskets, can be used as the first elastomeric seal 44. Note that the first elastomeric seal 44 in the embodiment illustrated in FIG. 8 is adapted to be disposed beneath the center of the exterior threads 40 of the fire sprinkler head 42.

Alternatively, the internal threads 38 can be sized and dimensioned to produce interference with the exterior threads 40 of a sprinkler head 42. In this alternative embodiment, no elastomeric seal 44 is needed at the base of the insert 14.

The insert 14 is disposed within the body 12 such that the insert 14 is rotatable with respect to the body 12 without effecting the distance D. Preferably, the insert 14 is rotatable within the body 12 only by application of a torque of at least about 2½ ft-lbs, typically greater than 5 ft-lbs, and most typically between about 5 ft-lbs and about 60 ft-lbs.

In the embodiments illustrated in the drawings, the seal between the insert 14 and the body 12 is reinforced with an optional second elastomeric seal 46. The second elastomeric seal 46 can be an elastomeric gasket, an elastomeric O-ring or other form of elastomeric seal known to those in the art.

The insert 14 is typically made from a metal, such as a brass. However, the insert 14 can alternatively be made from a polymeric material, such as a plastic, so long as the polymeric material has a melting point at least 10° F. greater than the melting point of the body 12.

Where the body 12 is made from a polymeric material, a collar 48, typically a metal collar, can be disposed around the body 12 to reduce stress on the body 12 by the insert 14. The collar 48 is sized so as to not cover an undue portion of the over-molded plastic. Covering an undue portion of the over-molded plastic unnecessarily increases operating torque. Thus, the collar 48 is preferably disposed around the body 12 such that the collar 48 extends around the distal bore portion 22, but not around the proximal bore portion 24. Preferably, the collar 48 also provides a wrench head 50 with gripping flats 52 for conveniently retaining the collar 48 (and the body 12) when the insert 14 is rotated.

Figure 6:
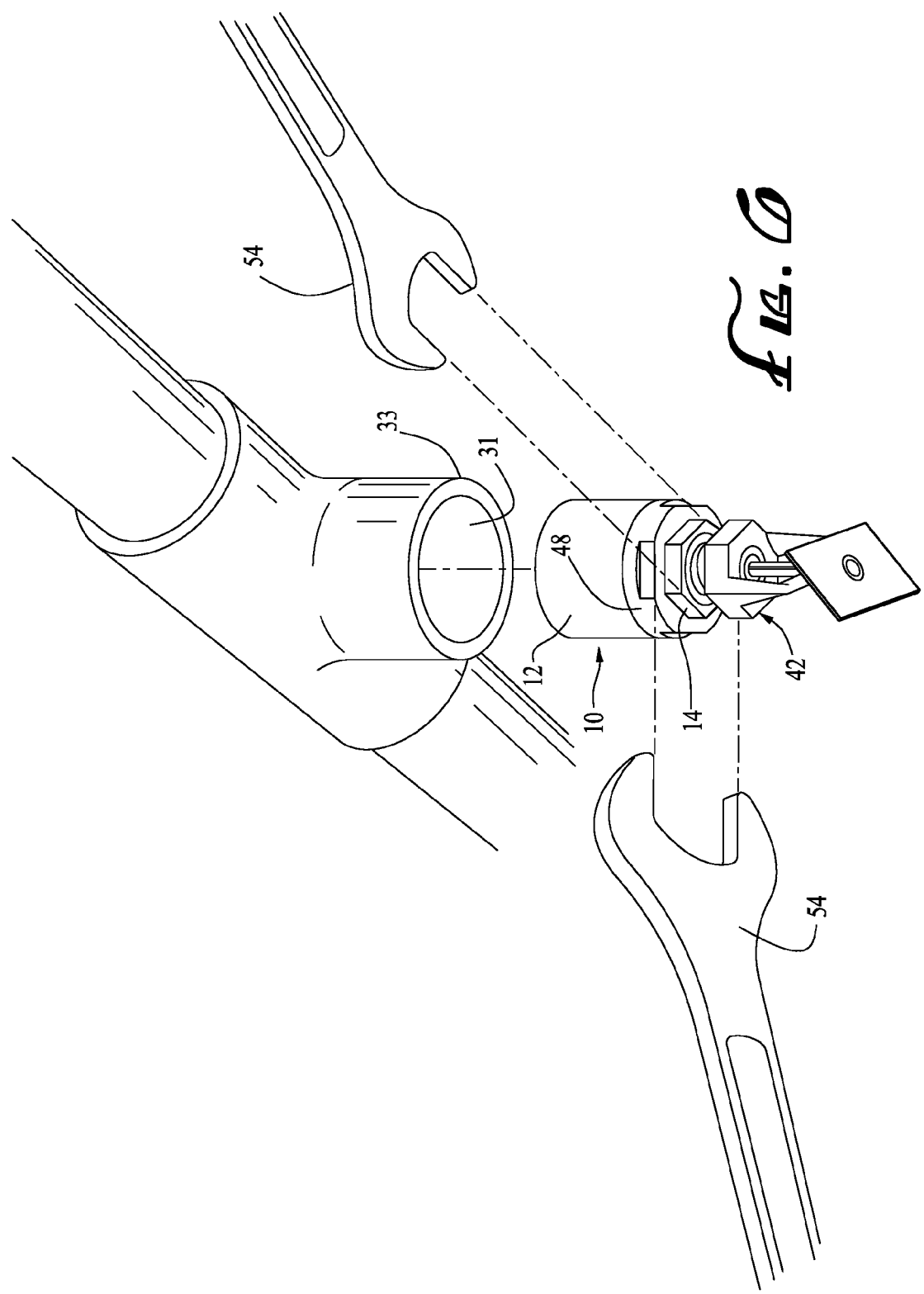
FIG. 6 illustrates the installation and alignment of a fire sprinkler using the fire sprinkler fitting illustrated in FIG. 1.

FIG. 6 illustrates the installation of the embodiment of the invention illustrated in FIGS. 1, 4 and 5 into the internal bore 31 of a fitting 33 used in a water supply header. In a first step, the fitting of the invention 10 is disposed within the internal bore 31 of the water supply header fitting 33, and is retained therein with an appropriate glue or cement. A fire sprinkler head 42 can be disposed within the outer end 34 of the insert 14, either before or immediately after this first step. After the fitting 10 has been securely disposed within the water supply header fitting 33, wrenches 54 can be used to rotate the insert 14 with respect to the body 12 to optimally adjust and orient the sprinkler head 42.

As can be seen from the foregoing discussion, the inserts of the invention allow the installer to attach fire sprinklers to fire sprinkler water pipes without having to use specially designed fire sprinkler attachment fittings. Also, the inserts of the invention allow the installer to install fire sprinklers into fire sprinkler piping in such a way as to consistently achieve optimum attachment alignment and tightening.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. A fire sprinkler fitting comprising:
   (a) a cylindrical polymeric body defining a bore with a center line, an open bore end, the bore having a distal portion adjacent to the open bore end and a proximal portion spaced apart from the open bore end, the proximal portion defining a shoulder disposed in a plane perpendicular to the center line;
   (b) an insert having an outer end and an inner end, the inner end being disposed within the proximal portion of the bore such that the outer end protrudes beyond the open bore end, the outer end having internal threads which are sized and dimensioned to accept and retain a fire sprinkler therein, the inner end having a circumferential flange which abuts and is retained by the shoulder defined within the proximal portion of the bore in the cylindrical body, the insert having a melting point greater than that of the polymeric body; and
   (c) a metal collar disposed tightly around the polymeric body such that the collar extends around the distal bore portion, but not around the proximal bore portion;
   whereby the insert is rotatable within the polymeric body.

2. The fire sprinkler fitting of claim 1 wherein the insert comprises a base and wherein the fitting further comprises an elastomeric seal disposed within the insert, at the base of the insert, for sealing a fire sprinkler to the insert.

3. The fire sprinkler fitting of claim 2 wherein the elastomeric seal is an O-ring.

4. The fire sprinkler fitting of claim 1 wherein the insert is retained within the proximal portion of the bore a distance of L from the open bore end, and wherein the metal collar extends downwardly from the open bore end in a direction parallel to the center line of the bore a distance of between about ¼ L and about ¾ L.

5. The fire sprinkler fitting of claim 1 wherein the insert further comprises a wrench head defined around the outer end.

6. The fire sprinkler fitting of claim 1 wherein the insert is rotatable within the polymeric body only by application of a torque to the insert greater than about 2.5 ft-lbs.

7. The fire sprinkler fitting of claim 1 wherein the insert has a melting point at least 10 degrees Fahrenheit greater than that of the polymeric body.

8. A fire sprinkler fitting comprising:
   (a) a cylindrical polymeric body defining a bore with a center line, an open bore end, the bore having a distal portion adjacent to the open bore end and a proximal portion spaced apart from the open bore end, the proximal portion defining a shoulder disposed in a plane perpendicular to the center line;
   (b) a metallic insert having an outer end and an inner end, the inner end being disposed a distance L within the proximal portion of the bore such that the outer end protrudes beyond the open bore end, the outer end having internal threads which are sized and dimensioned to accept and retain a fire sprinkler therein, the inner end having a circumferential flange which abuts and is retained by the shoulder defined within the proximal portion of the bore in the cylindrical body, the metallic insert further comprising a wrench head defined around the outer end; and
   (c) a metal collar disposed tightly around the polymeric body such that the collar extends around the distal bore portion, but not around the proximal bore portion;
   whereby the metallic insert is rotatable within the polymeric body.

9. The fire sprinkler fitting of claim 8 further comprising an elastomeric seal disposed within the metallic insert, at the base of the metallic insert, for sealing a fire sprinkler to the metallic insert.

10. The fire sprinkler fitting of claim 9 wherein the elastomeric seal is an O-ring.

11. The fire sprinkler fitting of claim 8 wherein the metallic insert is rotatable within the polymeric body only by application of a torque to the metal insert greater than about 2.5 ft-lbs.

12. A fire sprinkler fitting comprising:
   (a) a cylindrical polymeric body defining a bore with a center line, an open bore end, the bore having a distal portion adjacent to the open bore end and a proximal portion spaced apart from the open bore end, the proximal portion defining a shoulder disposed in a plane perpendicular to the center line;

(b) a metallic insert having an outer end and an inner end, the inner end being disposed a distance L within the proximal portion of the bore such that the outer end protrudes beyond the open bore end, the outer end having internal threads which are sized and dimensioned to accept and retain a fire sprinkler therein, the inner end having a circumferential flange which abuts and is retained by the shoulder defined within the proximal portion of the bore in the cylindrical body, the metallic insert further comprising a wrench head defined around the outer end;

(c) an elastomeric seal disposed within the metallic insert, at the base of the metallic insert, for sealing a fire sprinkler to the metallic insert; and (d) a metal collar disposed tightly around the polymeric body such that the collar extends around the distal bore portion, but not around the proximal bore portion;

whereby the metallic insert is rotatable within the polymeric body but only upon application of a torque to the metal insert greater than about 2.5 ft-lbs.

13. The fire sprinkler fitting of claim 12 wherein the elastomeric seal is an O-ring.

14. A fire sprinkler fitting comprising:

(a) a cylindrical body defining a bore with a center line, an open bore end, the bore having a distal portion adjacent to the open bore end and a proximal portion spaced apart from the open bore end, the proximal portion defining a shoulder disposed in a plane perpendicular to the center line; and (b) an insert having an outer end and an inner end, the inner end being disposed within the proximal portion of the bore such that the outer end protrudes beyond the open bore end by a distance D, the outer end having internal threads which are sized and dimensioned to accept and retain a fire sprinkler therein, the inner end having a circumferential flange which abuts and is retained by the shoulder defined within the proximal portion of the bore in the cylindrical body;

wherein the insert is rotatable within the body without affecting the distance D.

15. The fire sprinkler fitting of claim 14 further comprising an elastomeric seal disposed within the insert, at the base of the insert, for sealing a fire sprinkler to the insert.

16. The fire sprinkler fitting of claim 15 wherein the elastomeric seal is an O-ring.

17. The fire sprinkler fitting of claim 14 wherein the insert further comprises a wrench head defined around the outer end.

18. The fire sprinkler fitting of claim 14 wherein the insert is rotatable within the body only by application of a torque to the insert greater than about 2.5 ft-lbs.

19. The fire sprinkler fitting of claim 14 wherein the insert has a melting point at least 10 degrees Fahrenheit greater than that of the body.

* * * * *